United States Patent
Tran et al.

(10) Patent No.: US 9,495,413 B2
(45) Date of Patent: Nov. 15, 2016

(54) SYSTEMS AND METHODS FOR ACCESSING DATA FROM A DATABASE

(75) Inventors: Quan Chi Tran, Upper Darby, PA (US); Xiaoda Gong, Audubon, PA (US)

(73) Assignee: The Babcock & Wilcox Company, Barberton, OH (US)

( * ) Notice: Subject to any disclaimer, the term of this patent is extended or adjusted under 35 U.S.C. 154(b) by 1304 days.

(21) Appl. No.: 12/491,324

(22) Filed: Jun. 25, 2009

(65) Prior Publication Data

US 2010/0332469 A1    Dec. 30, 2010

(51) Int. Cl.
*G06F 17/30* (2006.01)

(52) U.S. Cl.
CPC .............................. *G06F 17/30392* (2013.01)

(58) Field of Classification Search
None
See application file for complete search history.

(56) References Cited

U.S. PATENT DOCUMENTS

| | | | |
|---|---|---|---|
| 5,826,269 A * | 10/1998 | Hussey | |
| 5,859,972 A * | 1/1999 | Subramaniam et al. | 709/203 |
| 6,571,232 B1 | 5/2003 | Goldberg et al. | |
| 7,870,117 B1 * | 1/2011 | Rennison | 707/706 |
| 2002/0161857 A1* | 10/2002 | Narasimhan et al. | 709/219 |
| 2004/0098359 A1* | 5/2004 | Bayliss et al. | 707/1 |
| 2005/0171934 A1* | 8/2005 | Yuknewicz et al. | 707/3 |
| 2006/0277157 A1 | 12/2006 | Seidl et al. | |
| 2007/0016960 A1* | 1/2007 | Glaser et al. | 726/27 |

* cited by examiner

*Primary Examiner* — Syed Hasan
(74) *Attorney, Agent, or Firm* — Eric Marich

(57) ABSTRACT

Systems and methods for accessing data from a database are provided. A user selection of a database object may be received. One or more input fields for obtaining user input associated with the selected database object may be dynamically generated and presented to the user. User input associated with the selected database object may be received via the one or more generated input fields. A database query may then be generated utilizing the received user input, and the database may be queried utilizing the constructed database query.

20 Claims, 4 Drawing Sheets

SYSTEMS AND METHODS FOR ACCESSING DATA FROM A DATABASE

FIELD OF THE INVENTION

Embodiments of the invention relate generally to databases and more specifically to systems and methods for accessing data from a database.

BACKGROUND OF THE INVENTION

Databases are utilized in a wide variety of applications to store and organize data. Various types of software has been created to facilitate management of databases and/or the accessing of data that is stored in databases. Structured Query Language (SQL) is one database computer language designed for the retrieval and management of data stored in databases, such as data stored in relational database management systems.

SQL is a language that generally requires database objects and/or database queries to be described in accordance with a specific SQL syntax. Typically, an individual utilizing SQL to access a database, such as a computer programmer, must have specific knowledge of the required SQL syntax. Accordingly, it may be difficult for users without this computer programmer knowledge to generate appropriate SQL commands and/or SQL database queries.

Therefore, a need exists for systems and methods for accessing data from a database.

BRIEF DESCRIPTION OF THE INVENTION

Some or all of the above needs and/or problems may be addressed by certain embodiments of the invention. Embodiments of the invention may include systems and methods for accessing data from a database. According to one embodiment of the invention, there is disclosed a method for accessing data from a database. A user selection of a database object may be received. One or more input fields for obtaining user input associated with the selected database object may be dynamically generated and presented to the user. User input associated with the selected database object may be received via the one or more generated input fields. A database query may then be generated utilizing the received user input, and the database may be queried utilizing the constructed database query.

According to another embodiment of the invention, there is disclosed a system for accessing data from a database. The system may include a communications interface and at least one processor. The communications interface may be operable to receive a user selection of a database object and user input associated with the selected database object. The at least one processor may be operable to dynamically generate one or more input fields for obtaining user input associated with the selected database object and to direct the communications interface to communicate the one or more input fields to the user to facilitate the receive of the user input. The at least one processor may further be operable to construct a database query utilizing the received user input and to query the database utilizing the constructed database query.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
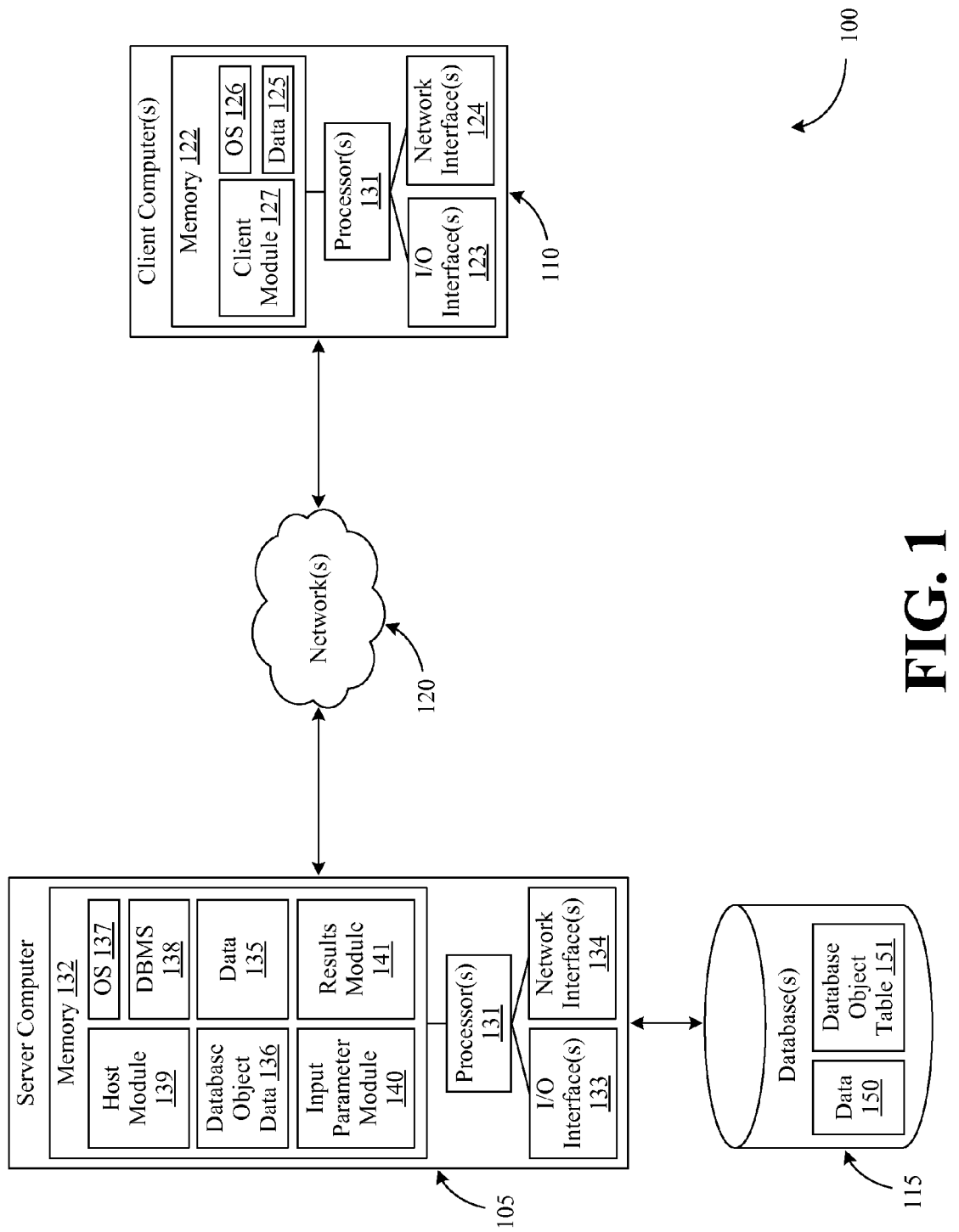

Having thus described the invention in general terms, reference will now be made to the accompanying drawings, which are not necessarily drawn to scale, and wherein:

FIG. 1 is a schematic diagram of one example system for facilitating the access of data from a database, according to an illustrative embodiment of the invention.

Figure 2:
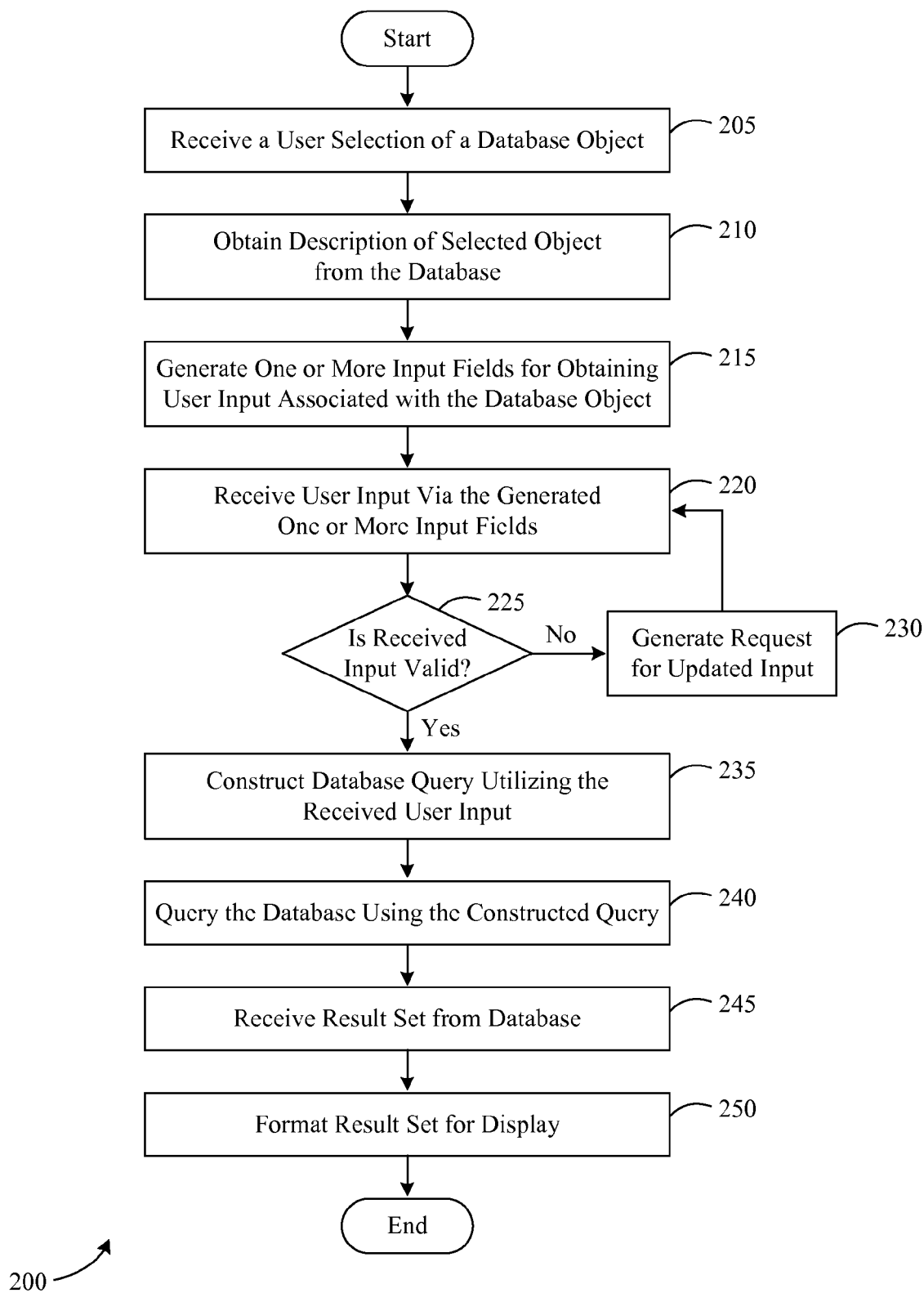

FIG. 2 is a flow chart of one example method for facilitating the access of data from a database, according to an illustrative embodiment of the invention.

Figure 3:
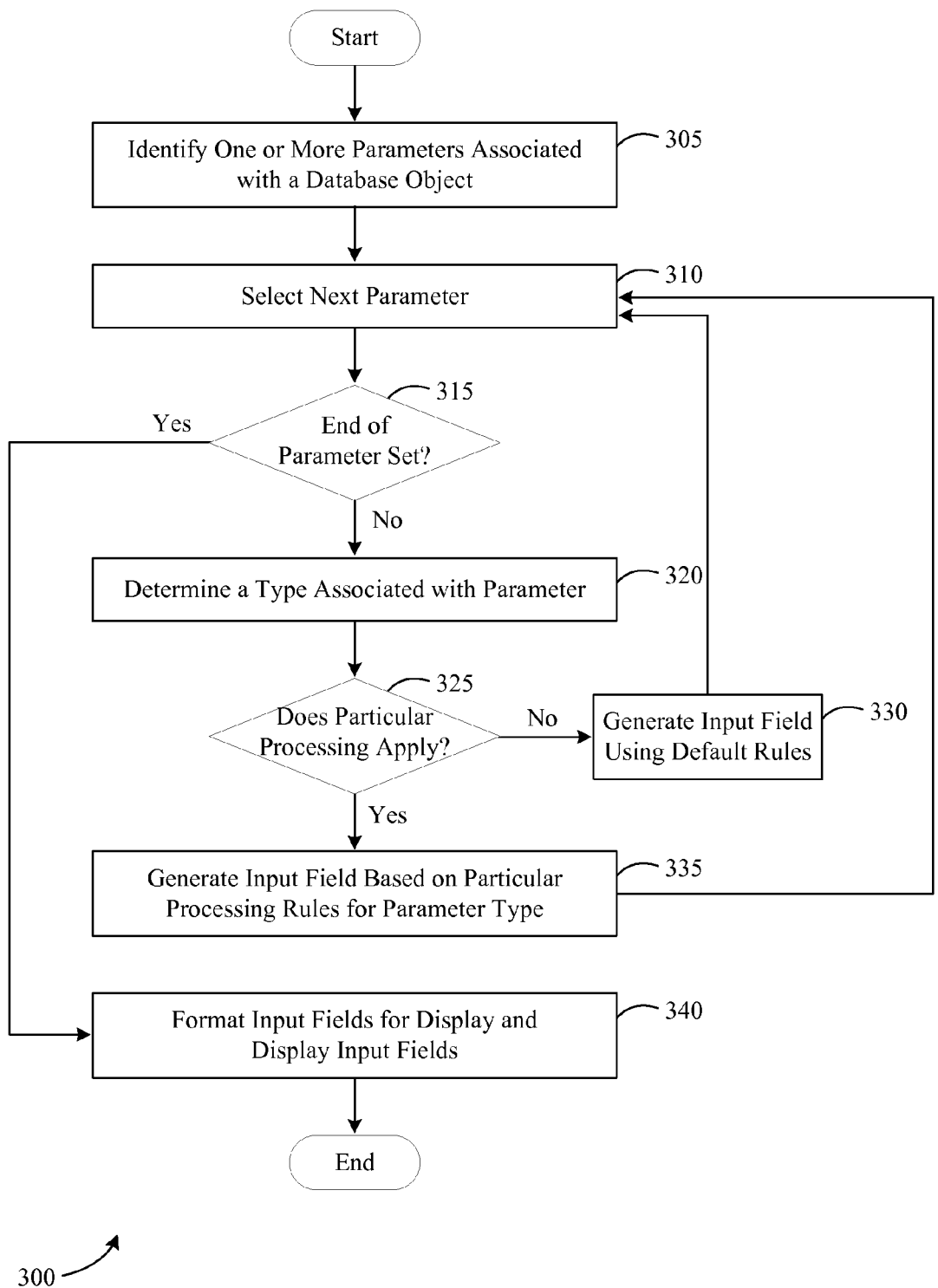

FIG. 3 is a flow chart of one example method for formatting input fields for receiving user input associated with a database object, according to an illustrative embodiment of the invention.

Figure 4:
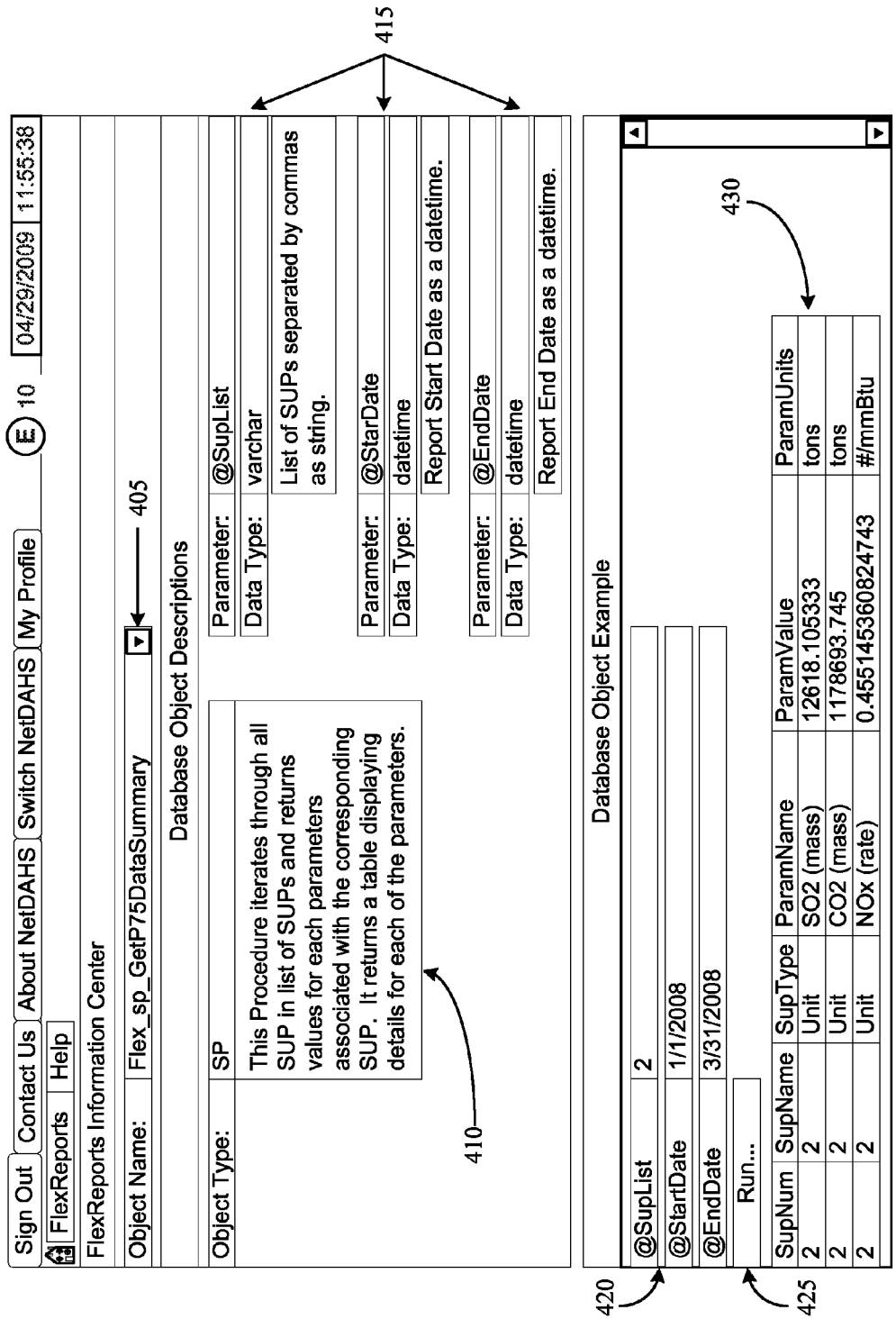

FIG. 4 is one example graphical user interface that may be utilized to facilitate the receipt of user input associated with a database object, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For purposes of this disclosure, the term "database object" may refer to a function, stored procedure, view, or other call that is utilized to retrieve data from a database. A database object may include any number of input parameters that are utilized to complete a retrieval of data from a database.

Disclosed are systems and methods for accessing data or information from a database. A user selection of a database object may be received at a computer, such as a server computer, via a network. The computer may dynamically generate one or more input fields for obtaining user input associated with the selected database object, and the one or more generated input fields may be displayed to the user. User input associated with the selected database object may be received via the generated input fields. A database query may be constructed utilizing the received user input, and the database may be queried utilizing the constructed database query. In this regard, database queries may be generated dynamically without the user having specific knowledge of database programming language, such as knowledge of SQL syntax.

Various embodiments of the invention may include one or more special purpose computers, systems, and/or particular machines that facilitate the access of data from a database. A special purpose computer or particular machine may include a wide variety of different software modules as desired in various embodiments. As explained in greater detail below, in certain embodiments, these various software components may be utilized to collect user information associated with a database object and to dynamically generate database queries based upon the received user input.

Embodiments of the invention described herein may have the technical effect of dynamically generating one or more input fields to receive user input associated with a database object. Additionally, embodiments of the invention may have the technical effect of dynamically generating one or more database queries based upon the received user input in order to access information from a database.

FIG. 1 is a block diagram of one example system 100 for facilitating the access of data from a database, according to an illustrative embodiment of the invention. The system 100 may include a server computer 105, one or more client computers 110, and one or more databases 115. The server computer 105 may be in network communication with any number of client computers via one or more suitable networks 120, for example, a local area network, a wide area network, the Internet, a cellular network, a Bluetooth enabled network, a WiFi enabled network, a radio frequency network, or any other network capable of transmitting data.

Any number of client computers 110 may be included in various embodiments of the invention as desired. In various embodiments of the invention, such as the embodiment shown in FIG. 1, a user associated with a client computer 110 may utilize the client computer 110 and/or associated software to access the server computer 105. For example, a user may utilize an appropriate web browser associated with the client computer 110 to access a web server hosted by the server computer 105. As another example, a user may utilize the client computer 110 to access the server computer 105 via a direct connection. The server computer 105 may then access the one or more databases 115 and return information to the client computer 110. In other embodiments of the invention, a user may communicate with the server computer 105 and utilize the server computer 105 to access the one or more databases 115. In still other embodiments of the invention, a client computer 110 may include functionality to directly access the one or more databases 115.

The client computer 110 may be a processor driven device that facilitates communication with the server computer 105 in order to access information stored in the one or more databases 115. For example, the client computer 110 may include any number of special purpose computers or particular machines, application specific circuits, programmable logic controllers (PLC), microcontrollers, personal computers, minicomputers, mainframe computers, supercomputers, and the like. In certain embodiments, the operations of the client computer 110 may be controlled by computer-executed or computer-implemented instructions that are executed by one or more processors associated with the client computer 110. The instructions may be embodied in one or more software components as desired in various embodiments of the invention. The execution of the instructions may form a special purpose computer or other particular machine that is operable to communicate with the server computer 105 in order to request database accesses. The one or more processors that control the operations of the client computer 110 may be incorporated into the client computer 110 and/or in communication with the client computer 110 via one or more suitable networks. In certain embodiments of the invention, the operations and/or control of the client computer 110 may be distributed amongst several processing components.

The client computer 110 may include one or more processors 121, one or more memory devices 122, one or more input/output ("I/O") interface(s) 123, and one or more network interface(s) 124. The one or more memory devices 122 may be any suitable memory devices, for example, caches, read only memory devices, random access memory devices, magnetic storage devices, etc. The one or more memory devices 122 may store data, executable instructions, and/or various program modules utilized by the client computer 110, for example, data 125 that has been received from the server computer 105, an operating system 126, and a client module 127. The data 125 may include any suitable data that has been received from the server computer 105, for example, data associated with a database object, one or more input fields associated with a database object, and/or one or more result sets obtained by querying a database. The operating system (OS) 126 may include executable instructions and/or program modules that facilitate and/or control the general operation of the client computer 110. For example, the OS 126 may facilitate the execution of other software programs and/or program modules by the processors 121. The client module 127 may include executable instructions and/or program modules that facilitate interaction with the server computer 105. For example, the client module 127 may include a suitable web browser or other dedicated program that facilitates interaction with a host module or web server associated with the server computer 105. In this regard, user input may be communicated to the server computer 105 and/or result sets associated with database queries may be received from the server computer 105.

The one or more input/output ("I/O") interfaces 123 may facilitate communication between the client computer 110 and one or more input/output devices, for example, one or more user interface devices, such as, a display, keyboard, mouse, keypad, control panel, touch screen display, remote control, microphone, etc. that facilitate user interaction with the client computer 110. The one or more network interfaces 124 may facilitate connection of the client computer 110 to one or more suitable networks, such as networks 120. In this regard, the client computer 110 may communicate with other components of the system 100, such as the server computer 105.

The server computer 105 may be a processor driven device that facilitates the accessing of information from the one or more databases 115 on behalf of any number of users that are associated with respective client computers 110. For example, the server computer 105 may include any number of special purpose computers or particular machines, application specific circuits, programmable logic controllers (PLC), microcontrollers, personal computers, minicomputers, mainframe computers, supercomputers, and the like. In certain embodiments, the operations of the server computer 105 may be controlled by computer-executed or computer-implemented instructions that are executed by one or more processors associated with the server computer 105. The instructions may be embodied in one or more software components as desired in various embodiments of the invention. The execution of the instructions may form a special purpose computer or other particular machine that is operable to communicate with one or more client computers 110, access information from the one or more databases 115, and return information to the client computers 110. The one or more processors that control the operations of the server computer 105 may be incorporated into the server computer 105 and/or in communication with the server computer 105 via one or more suitable networks. In certain embodiments of the invention, the operations and/or control of the server computer 105 may be distributed amongst several processing components.

The server computer 105 may include one or more processors 131, one or more memory devices 132, one or more input/output ("I/O") interface(s) 133, and one or more network interface(s) 134. The one or more memory devices 132 may be any suitable memory devices, for example, caches, read only memory devices, random access memory devices, magnetic storage devices, etc. The one or more memory devices 132 may store data, executable instructions, and/or various program modules utilized by the server computer 105, for example, data 135 that has been accessed from a database, database object data 136, an operating system 137, a database management system (DBMS) 138, a host module 139, an input parameter module 140, and/or a results module 141. The data 135 may include any suitable data that facilitates the querying of a database and/or data that has been accessed from a database, for example, one or more input fields associated with a database object and/or one or more result sets obtained by querying a database. The database object data 136 may include any suitable data associated with any number of database objects that are stored in the databases 115. For example, the database object data 136 may include a list of the various database objects that are stored in the databases 115.

The operating system (OS) 137 may include executable instructions and/or program modules that facilitate and/or control the general operation of the server computer 105. For example, the OS 137 may facilitate the execution of other software programs and/or program modules by the processors 131. The DBMS 138 may facilitate the management of one or more databases associated with the server computer 105, such as databases 115. The host module 139 may include executable instructions and/or program modules that facilitate interaction with any number of client computers 110. For example, the host module 139 may include a suitable web server or other dedicated program or program module that facilitates interaction with client modules and/or web browsers associated with client computers 110. In this regard, user input associated with database accesses may be received by the server computer 105 and/or result sets associated with database queries may be communicated from the server computer 105 to client computers 110.

The input parameter module 140 may include functionality that facilitates the collection of user input that may be utilized to generate a database query for a selected database object. A database object may be selected by a user and the selection may be received by the server computer 105 and the input parameter module 140. The input parameter module 140 may then obtain a description of the selected database. The description may be obtained from the database 115, from a memory device 132 associated with the server computer 105, and/or from one or more external memory devices or systems. The description of the database object may include one or more parameters that are utilized to access and/or query the database object. The input parameter module 140 may utilize the description of the database object to generate one or more input fields for obtaining user input associated with the database object. One example of generating one or more input fields is discussed in greater detail below with reference to FIG. 3. The generated one or more input fields may be displayed to the user via the client computer and utilized to obtain user input associated with the database object. For example, the one or more input fields may be displayed to the user via one or more suitable web pages or other graphical user interface screens. Once the user input is obtained, a database query may be generated by the input parameter module 140 and/or by the results module 141 to facilitate accessing and/or obtaining a result set from the database 115.

The results module 141 may facilitate the generation of a database query based upon user input that has been received for a database object. In certain embodiments, the results module 141 may utilize received user input to generate a database query in an appropriate database language that facilitates a database access. For example, the results module 141 may utilize received user input to generate a query in SQL syntax that is then utilized to query an SQL database. In certain embodiments, the results module 141 may act as a translator or compiler that transforms user input and/or other data, such as SQL syntax rules, into database query that may be utilized to obtain information from a SQL database. In this regard, the results module 141 may transform or convert the user input into an SQL syntax command. By converting the user input into a SQL syntax command, a user is not required to have specific programming knowledge of the SQL syntax that is necessary for generating SQL database queries.

The results module 141 may further facilitate the querying of a database and the collection of a result set that is received from the database as a result of the query. At least a portion of the result set may be communicated to the client computer 110 via the one or more networks 120. For example, at least a portion of the result set may be displayed to the user via one or more suitable web pages. The user may then choose to download at least a portion of the result set from the server computer 105. As another example, at least a portion of the result set may be electronically communicated to a client computer 110 via email, short message service (SMS) messaging, etc.

The one or more input/output ("I/O") interfaces 133 may facilitate communication between the server computer 105 and one or more input/output devices, for example, one or more user interface devices, such as, a display, keyboard, mouse, keypad, control panel, touch screen display, remote control, microphone, etc. that facilitate user interaction with the server computer 105. The one or more network interfaces 134 may facilitate connection of the server computer 105 to one or more suitable networks, such as networks 120. In this regard, the server computer 105 may communicate with other components of the system 100, such as the client computers 110.

With continued reference to FIG. 1, any number of databases 115 may be in communication with the server computer 105. These databases 115 may be hosted by the server computer 105 and/or hosted by one or more external systems and/or devices in communication with the server computer 105. Each database 115 may include logical data that is stored in a systematic format, such as a structured collection of records or data. As shown in FIG. 1, each database 115 may include data 150 and/or a database object table 151. The data 150 may include any number of records that are stored in the database 115. The records may be searched and/or queried as will be understood by those skilled in the art. The database object table 151 may include a list of database objects that may be utilized to access information from the database 115 and/or one or more respective parameters associated with each database object. In certain embodiments, the database object table 151 may be accessed by the input parameter module 140 to obtain one or more parameters associated with a database object selected by a user of a client computer 110. Once the one or more parameters associated with a database object are obtained, the input parameter module 140 may generate one or more user input fields to obtain user input that facilitates the generation of a database query.

As desired, embodiments of the invention may include a system 100 with more or less than the components illustrated in FIG. 1. The system 100 of FIG. 1 is provided by way of example only.

FIG. 2 is a flowchart illustrating one example method 200 for facilitating the access of data from a database, according to an illustrative embodiment of the invention. The method may be performed by one or more processors that facilitate the querying of a database, such as, the one or more processors 131 and associated stored logic and functionality of the server computer 105 illustrated in FIG. 1.

The method 200 may begin at block 205. At block 205, a user selection of a database object may be received. The user selection may be received utilizing a wide variety of different methods and techniques as desired in various embodiments of the invention. For example, a user selection may be received via one or more suitable web pages, web interfaces, and/or graphical user interfaces that are presented to the user. The server computer 105 may communicate any number of web pages and/or interfaces to a client computer 110 for presentation to the user via one or more suitable networks, such as the networks 120 illustrated in FIG. 1. In certain embodiments, the user may select a database object from a list of available database objects, such as a drop down menu of database objects that is presented to the user. As another example, a user selection of a database object may be received from a client computer 110 without any prompting information being communicated to the client computer 110 by the server computer 105. As yet another example, a user selection of a database object may be received at the server computer 105 utilizing one or more suitable input/output devices, such as a keyboard, keypad, mouse, touch screen display, etc. Once a user selection of a database object is received at block 205, operations may continue at block 210.

At block 210, a description of the selected database object may be obtained by the server computer 105. The description may be obtained utilizing a wide variety of suitable methods and/or techniques as desired in various embodiments of the invention. In certain embodiments, the server computer 105 may obtain the description of the selected database object from a database to be queried, such as database 115 illustrated in FIG. 1. For example, the database 115 may include a database object table 151 that includes descriptions of various database objects associated with the database. The server computer may query the database 115 and/or the database object table 151 to obtain a description of the selected database object. In other embodiments, the server computer 105 may obtain a description of the selected database object from one or more memories associated with the server computer 105 and/or from one or more external memory devices.

The description of the selected database object may include information associated with one or more parameters for the selected database object. For example, the description may include a list of parameters utilized in a database query for the selected database object. Once the description of the selected database object has been obtained at block 210, operations may continue at block 215.

At block 215, one or more input fields for obtaining user input associated with the selected database object may be generated. The one or more input fields may be dynamically generated based at least in part on the obtained database description. In certain embodiments, the input fields may be generated by the input parameter module 140 associated with the server computer 105. The input fields may facilitate the collection of user input for parameters associated with the database object. In this regard, user input for a database query may be obtained. One example method for generating input fields is described below with reference to FIG. 3.

The generated input fields may be presented to a user in order to obtain user input for a database parameter. The generated input fields may be presented to the user utilizing a wide variety of suitable methods and/or techniques. For example, the input fields may be presented to the user via one or more suitable web pages that facilitate the collection of user input. The user may enter input information associated with the selected database object, and the user input may be received by the server computer 105 at block 220. For example, the user may enter input information into input fields that are displayed to the user via one or more web pages or other graphical user interfaces, and the entered input information may be communicated to the server computer 105 via one or more suitable networks, such as networks 120.

At block 225, a determination may be made as to whether the received user input is valid. In certain embodiments, a determination may be made as to whether the received user input is valid input for the selected database object. For example, received user input may be compared to and/or evaluated in light of rules associated with one or more input parameters for a database object. As one example, if a parameter for a database object is an integer parameter, a determination may be made as to whether received user input for the parameter is an integer value. If it is determined at block 225 that the received user input is not valid, then operations may continue at block 230 and an appropriate message may be generated for display to the user. In certain embodiments, the message may indicate that the input is not valid. As desired, the message may request updated user input from the user. Operations may then continue at block 220 and updated user information may be received. If, however, it is determined at block 225 that the received user input is valid, then operations may continue at block 235.

At block 235, a database query may be constructed. The database query may be dynamically generated and/or constructed utilizing the received user input for the selected database object. The database query may be constructed in an appropriate database access language for the database 115. For example, an SQL database query may be constructed, and the SQL database query may be in a suitable SQL syntax. In certain embodiments, a suitable compiler program or database query module may construct a database query.

At block 240, the database 115 may be queried utilizing the constructed database query for the database object. A result set may be obtained or received from the database 115 at block 245. The result set may then be communicated to the user. For example, the result set may be formatted for display at block 250 and then communicated to the client computer 110 for presentation via one or more suitable web pages and/or other graphical user interfaces. As another example, the result set may be emailed to the client computer 110. Other suitable methods and/or techniques may be utilized as desired to communicate and/or display the result set to the user.

The method 200 may end following block 250.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

FIG. 3 is a flowchart illustrating one example method 300 for formatting input fields for receiving user input associated with a database object, according to an illustrative embodiment of the invention. The method 300 may be performed by one or more suitable components of a server computer, for example, by the input parameter module 140 of the server computer 105 illustrated in FIG. 1.

The method 300 may begin at block 305. At block 305, one or more parameters associated with a database object may be identified. The one or more parameters may define input that is needed to query a database in association with the database object. A wide variety of different types of parameters may be associated with a database object as desired in various embodiments of the invention. Examples of parameters include, but are not limited to, integers, floating point numbers, strings, dates, times, etc.

Once a set of parameters is identified at block 305, operations may continue at block 310. The parameters may be processed in an iterative manner to generate respective input fields for the parameters. At block 310, the next parameter in the set of parameters may be identified. Operations may then continue at block 315, and a determination may be made as to whether the end of the set of parameters has been reached. If it is determined at block 315 that the end of the set of parameters has been reached, then operations may continue at block 340. If, however, it is determined at block 315 that the end of the set of parameters has not been reached, then operations may continue at block 320.

At block 320, a parameter type associated with the parameter may be determined or identified. As set forth above, a wide variety of different parameters types may be utilized in association with various embodiments of the invention. According to an aspect of the invention, certain types of parameters may be processed utilizing one or more particular processing rules that apply to one or more types of parameters. Other types of parameters may be processed utilizing one or more default processing rules. For example, in one embodiment, an integer parameter or a string parameter may be processed utilizing default processing rules. As another example, in one embodiment, a date parameter may be processed utilizing one or more particular processing rules associated with the date parameter. Particular processing rules may be utilized as desired for any type of parameter. In the absence of particular processing rules for a parameter type, default processing rules may be utilized for the parameter type.

At block 325, a determination may be made as to whether particular processing applies for the type of parameter identified at block 320. If it is determined at block 325 that particular processing does not apply, then operations may continue at block 330, and an input field may be generated for the parameter utilizing default processing rules. Default processing rules may be utilized to process different types of parameters in similar manner. If, however, it is determined at block 325 that particular processing applies for the parameter type, then operations may continue at block 335, and an input field may be generated for the parameter based on particular processing rules for the parameter type.

At block 330, an input field may be generated for a parameter utilizing default processing rules. A wide variety of operations may be performed for by the default processing rules as desired in various embodiments of the invention. For example, the default processing rules may generate an input box that facilitates the receipt of user input for the parameter. As another example, the default processing rules may generate a description of the parameter for display to the user in order to solicit the receipt of user input for the parameter. As yet another example, the default processing rules may generate a description and/or indication of the parameter type for display to the user when soliciting user input. As one example, for an integer parameter, an input box may be generated to receive an integer input from the user. Additionally, an indicator may be generated to instruct the user to enter an integer value, and a description or name of the parameter may be generated for display to the user with the input box and/or indicator. Following the generation of the input field at block 330, operations may continue at block 310 and the next parameter may selected for processing.

At block 335, an input field may be generated utilizing particular processing rules for the identified parameter type. A wide variety of different particular processing rules may be associated with a parameter type, and a wide variety of different operations may be performed by the particular processing rules. As an example, particular processing rules may be utilized to process a date parameter type. The processing rules may generate a description of the parameter type and/or one or more user instructions for entering user input for the parameter. For example, a user may be instructed to enter a date and/or a range of dates in accordance with a particular format (e.g., a MM/DD/YYYY format). As another example, a calendar may be presented to a user and a date, several dates, and/or a range of dates may be selected using the calendar. Following the generation of the input field at block 335, operations may continue at block 310 and the next parameter may selected for processing.

Once input fields have been generated for each of the parameters associated with a database object, operations may continue at block 340. At block 340, the generated input fields may be formatted for display to a user. For example, the generated input fields may be formatted for display via one or more web pages and/or other graphical user interfaces that may be presented to the user via a suitable network connection. Once formatted for display, the generated input fields may be presented to the user in order to solicit and receive user input associated with the database object.

The method 300 may end following block 340.

The operations described in the method 300 of FIG. 3 do not necessarily have to be performed in the order set forth in FIG. 3, but instead may be performed in any suitable order. Additionally, in certain embodiments of the invention, more or less than all of the elements or operations set forth in FIG. 3 may be performed.

In accordance with certain embodiments of the invention, a selection of a database object and/or user input associated with a selected database object may be received from a user via one or more suitable web pages, web interfaces, and/or other graphical user interfaces. As illustrated in FIG. 1, these interfaces may be communicated to a client computer 110 associated with the user by a server computer 105 via one or more suitable networks 120. FIG. 4 is one example graphical user interface screen 400 that may be utilized to facilitate the receipt of user input associated with a database object, according to an illustrative embodiment of the invention.

With reference to FIG. 4, the interface screen 400 may include a list 405 of database objects to facilitate the selection of a database object by the user. As shown, the list 405 may include a drop down menu of database objects. Additionally or alternatively, the interface screen 400 may include one or more input boxes that allow a user to enter information associated with a desired database object and/or to search for a database object.

Once a database object is selected, one or more input fields 420 may be dynamically generated for the database object in order to obtain user input associated with the selected database object. As shown in FIG. 4, the interface screen 400 may include a description 410 of the selected database object once a database object is selected. The interface screen 400 may also include one or more descriptions 415 for each of the parameters associated with the selected database object. Each description may include a name of a parameter, a parameter type associated with the parameter, and/or a description and/or instructions associated with the parameter. Further, the interface screen 400 may include one or more input fields 420 that facilitate the collection of user input for the various parameters associated with the database object.

Once user input has been entered by the user, the user may select a run command 425 in order to query the database using the selected database object. Once the run command 425 is selected, the user input may be utilized to dynamically generate a database query in an appropriate syntax and/or database query language, such as a query in SQL syntax. The database may then be queried and results 430 of the query may be presented to the user.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for accessing data from a database, the method comprising:
   receiving, at a computer via a network, information associated with at least one database object;
   retrieving, via the database, at least one database object from a set thereof in response to the received information, the at least one database object including at least one of a function, a call, a procedure, or a view of data stored in the database;
   receiving, at the computer via the network, a user selection of a database object;
   dynamically generating, by the computer, one or more input fields for obtaining user input associated with the selected database object, wherein the generated one or more input fields are displayed to the user;
   receiving, via the one or more generated input fields, user input associated with the selected database object;
   dynamically converting the received user input associated with the selected database object into a syntax corresponding to the database;
   dynamically generating, by the computer, a database query in at least one of the syntax or a language corresponding to the database utilizing the dynamically converted user input in accordance with the selected database object; and
   querying the database utilizing the dynamically generated database query and selected database object.

2. The method of claim 1, further comprising:
   receiving a result set from the database in response to the database query, and
   electronically communicating at least a portion of the result set to an associated user via at least one of electronic mail and short message service.

3. The method of claim 2, further comprising:
   formatting the received result set for display to the user.

4. The method of claim 1, further comprising:
   obtaining a description of the selected database object from the database,
   wherein generating one or more input fields comprises generating one or more input fields based at least in part on the obtained description.

5. The method of claim 4, wherein the description of the selected database object comprises one or more parameters utilized in the query for the selected database object.

6. The method of claim 1, wherein the generated one or more input fields are displayed to the user via a web browser.

7. The method of claim 1, wherein generating one or more input fields comprises:
identifying one or more parameters associated with the selected database object;
determining a respective type associated with each of the one or more parameters; and
iteratively generating one or more respective input fields based on the determined respective types.

8. The method of claim 7, wherein generating one or more respective input fields based on the determined respective types comprises:
identifying at least one parameter type as a parameter type to receive particular processing;
accessing one or more rules for processing the identified at least one parameter type; and
processing the identified at least one parameter type utilizing the accessed one or more rules.

9. The method of claim 8, wherein the one or more rules includes a default rule, the method further comprising:
generating a description of the identified one or more parameters and determined respective type thereof;
displaying the description in association with the one or more generated input fields corresponding to the one or more parameters and determined type thereof so as to solicit a user for input thereof;
validating user input received via the one or more generated input fields in accordance with the default rule; and
querying the database utilizing the constructed database query in accordance with a validated user input.

10. The method of claim 1, wherein constructing a database query comprises constructing a structured query language (SQL) database query.

11. A system for accessing data from a database, the system comprising:
a communications interface operable to receive, via a network, information associated with at least one database object, retrieve, via the database, the at least one database object responsive to the received information, the at least one database object including at least one of a function, a call, a procedure, or a view of data stored in the database, and receive a user selection of a database object and user input associated with the selected database object; and
at least one processor operable (i) to dynamically generate one or more input fields for obtaining user input associated with the selected database object, (ii) to direct the communications interface to communicate the one or more input fields to the user to facilitate the receipt of the user input, (iii) to dynamically convert the received user input associated with the selected database object into a syntax corresponding to the database, (iv) to dynamically generate a database query in at least one of the syntax or a language corresponding to the database utilizing the dynamically converted user input in accordance with the selected database object, and (v) to query the database utilizing the dynamically generated database query and selected database object.

12. The system of claim 11, wherein the at least one processor is further operable to receive a result set from the database in response to the database query, and to electronically communicating at least a portion of the result set to an associated user via at least one of electronic mail and short message service.

13. The system of claim 12, wherein the at least one processor is further operable to format the received result set for display to the user.

14. The system of claim 11, wherein the at least one processor is further operable to obtain a description of the selected database object from the database, and
wherein the one or more input fields are generated based at least in part on the obtained description.

15. The system of claim 14, wherein the description of the selected database object comprises one or more parameters utilized in the query for the selected database object.

16. The system of claim 11, wherein the generated one or more input fields are displayed to the user via a web browser.

17. The system of claim 11, wherein the at least one processor is operable to generate the one or more input fields by:
identifying one or more parameters associated with the selected database object;
determining a respective type associated with each of the one or more parameters; and
iteratively generating one or more respective input fields based on the determined respective types.

18. The system of claim 17, wherein the at least one processor is operable to generate one or more respective input fields based on the determined respective types by:
identifying at least one parameter type as a parameter type to receive particular processing;
accessing one or more rules for processing the identified at least one parameter type; and
processing the identified at least one parameter type utilizing the accessed one or more rules.

19. The system of claim 18, wherein the at least one processor is operable to:
generate a description of the identified one or more parameters and determined respective parameter type thereof;
display the description in association with the one or more generated input fields corresponding to the one or more parameters and determined type thereof so as to solicit a user for input thereof;
validate user input received via the one or more generated input fields in accordance with a default rule; and
query the database utilizing the constructed database query in accordance with a validated user input.

20. The system of claim 11, wherein the database query comprises a structured query language (SQL) database query.

* * * * *